March 26, 1935.  W. O. FLEMING  1,995,974
LEER
Filed Nov. 22, 1933
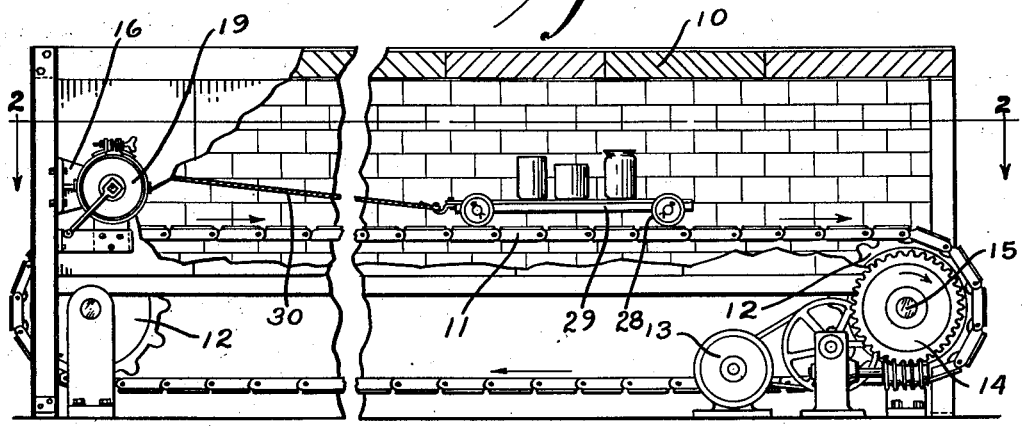
Fig. 1
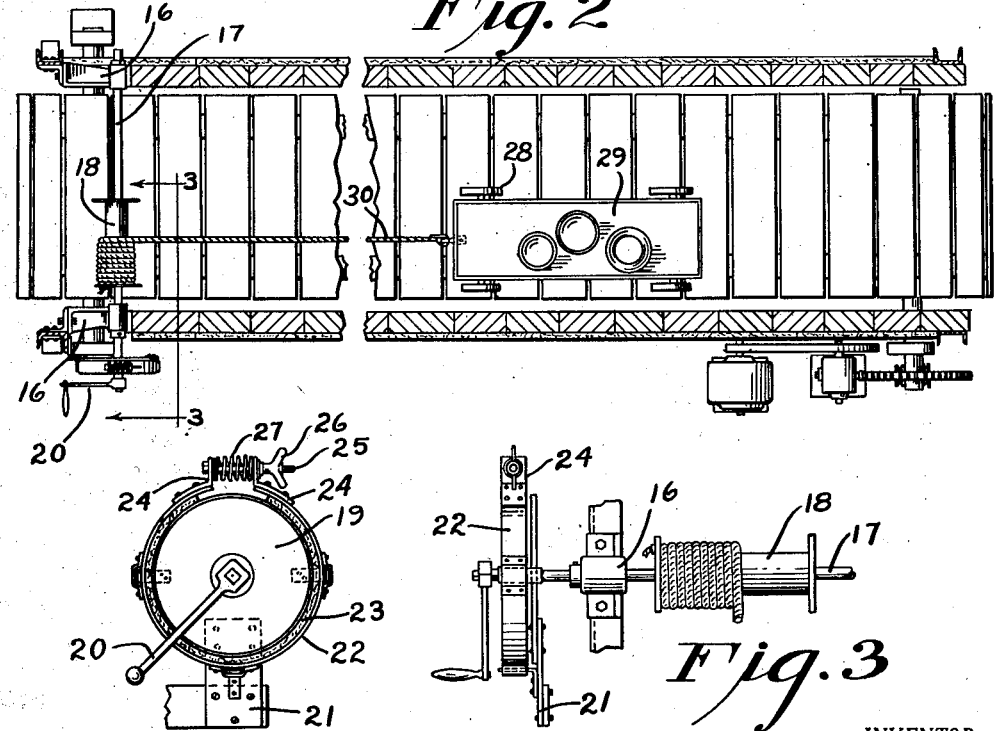
Fig. 2
Fig. 4
Fig. 3
INVENTOR.
WARREN O. FLEMING
BY Dorsey & Cole
ATTORNEYS.

Patented Mar. 26, 1935

1,995,974

UNITED STATES PATENT OFFICE 1,995,974

LEER

Warren O. Fleming, Corning, N. Y., assignor to Corning Glass Works, Corning, N. Y., a corporation of New York Application November 22, 1933, Serial No. 699,218

5 Claims. (Cl. 198—108)

This invention relates to leers and more particularly to leers used for annealing glass articles.

The object of the invention is to permit simultaneous annealing of articles which demand different annealing schedules in the same leer.

The above and other objects may be attained by employing my invention which embodies among its features a leer having a leer belt which travels at a constant speed, a carriage which rides upon and is driven by the leer belt and means for retarding the speed of motion of the carriage so that the leer belt passes under it.

In the drawing:

Fig. 1 is a side view partially in section of a leer embodying my invention;

Fig. 2 is a horizontal, sectional view taken on the line 2—2 of Fig. 1;

Fig. 3 is an enlarged side view of the carriage retarding means; and

Fig. 4 is an end view of Fig. 3.

Referring to the drawing in detail, I employ a leer 10 having a leer belt 11 which runs over the usual sprocket wheels 12. The leer belt 11 is driven in the direction of the arrows at a normal speed by a motor 13 which operates through a suitable gearing 14 to drive shaft 15 to which certain of the sprocket wheels 12 are secured.

Mounted on the brackets 16, which are carried by the supports for the side walls of the leer at its receiving end, is a shaft 17 carrying intermediate its ends a drum 18. As shown in Fig. 2, one end of the shaft 17 extends beyond the outer face of one wall of the leer 10 and carries a brake drum 19 (Fig. 4) and a crank 20. Attached to a bracket 21 carried by one of the leer supports near the bracket 16 adjacent the brake drum 19 is a brake band 22 which surrounds the drum 19 and carries a brake shoe 23 which partially embraces the drum. Ears 24 extend outwardly from the adjacent ends of the band 22 and are perforated to receive a bolt 25 which carries on its threaded end a wing nut 26 by which the band 22 may be contracted about the drum 19 to cause the shoe 23 to frictionally engage the latter. A compression coil spring 27 surrounds the bolt 25 between the ears 24 to urge the ears apart as the nut 26 is retracted on the bolt 25.

Mounted within the leer on suitable rollers 28 which run on the leer belt 11 is a carriage 29 to one end of which is attached one end of a flexible member 30, the opposite end of which is secured to the drum 18. As shown the flexible member 30 is adapted to be wound upon the drum 18 by turning the crank 20 and thus rotating the shaft 17. As the flexible member is wound upon the drum it will be seen that the carriage will be drawn toward the receiving end of the leer ready for loading, in which position it is held by turning the wing nut 26 to contract the brake band 22 and tighten the shoe 23 about the drum 19. The carriage is thus held in position for loading. After the carriage has been loaded the wing nut 25 is backed off to relieve the pressure of the brake shoe on the drum and by reason of the drag exerted upon the carriage by the movement of the leer belt 11, it will be seen that the carriage will be moved by and in the direction of the latter. By properly adjusting the tension of the brake band 22 the degree of frictional contact between the shoe 23 and drum 19 can be regulated to permit the carriage 29 to be moved through the leer by the belt 11 at the desired rate of speed. After the carriage has reached the end of the leer, it may be unloaded and returned to its original position by turning the crank 20 and rotating the shaft 17 to again wind the flexible member 30 on the drum 18.

By this arrangement it will be obvious that articles requiring the ordinary annealing treatment can be placed on the leer belt in the usual manner whereas articles which require a longer period of time to anneal can be placed on the carriage 29 and annealed in the same leer. Hence in a single leer it is possible by using my invention to anneal articles of widely varying annealing schedules and as a result considerable savings are effected.

While in the foregoing there has been shown and described the preferred embodiment of my invention, it is to be understood that minor changes in the details of construction, combination, and arrangement of parts may be resorted to without departing from the spirit and scope of my invention as claimed.

What is claimed is:

1. The combination with a leer having a continuously moving leer belt, of an independently movable carriage supported on the leer belt and adapted to be moved by it, and means for regulating the speed of movement of the carriage independently of the speed of movement of the leer belt.

2. The combination with a leer having a continuously moving leer belt, of a carriage supported on the leer belt for movement by it, a flexible member attached to the carriage and to the loading end of the leer, and means for paying out the flexible member at a predetermined rate of speed.

3. The combination with a leer having a continuously moving leer belt, of a carriage supported on the leer belt for movement by it, a flexible member having one end attached to the carriage, a winding drum to which the opposite end of the flexible member is attached and means for governing the speed of rotation of the winding drum as the carriage moves away from it under the influence of the leer belt.

4. The combination with a leer having a continuously moving leer belt, of a carriage supported on the leer belt for movement by it, a flexible member having one end attached to the carriage, a winding drum to which the opposite end of the flexible member is attached, means for governing the speed of rotation of the winding drum as the carriage moves away from it under the influence of the leer belt and means to rotate the winding drum to return the carriage to its starting position.

5. The combination with a leer having a continuously moving leer belt, of a carriage supported on the leer belt for movement by it, a flexible member having one end attached to the carriage, a winding drum to which the opposite end of the flexible member is attached and a brake for retarding the speed of rotation of the winding drum as the carriage moves away from it under the influence of the leer belt.

WARREN O. FLEMING.